United States Patent
Mühlbauer

(10) Patent No.: US 7,035,990 B1
(45) Date of Patent: Apr. 25, 2006

(54) METHOD FOR DYNAMIC MEMORY MANAGEMENT

(75) Inventor: Gerhard Mühlbauer, Freilassing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 266 days.

(21) Appl. No.: 10/111,885

(22) PCT Filed: Oct. 25, 2000

(86) PCT No.: PCT/EP00/10492

§ 371 (c)(1),
(2), (4) Date: Oct. 25, 2002

(87) PCT Pub. No.: WO01/31454

PCT Pub. Date: May 3, 2001

(30) Foreign Application Priority Data

Oct. 27, 1999   (DE) ................................ 199 51 716

(51) Int. Cl.
*G06F 12/00* (2006.01)

(52) U.S. Cl. .................... 711/172; 711/170; 711/171; 711/173; 707/206; 718/104

(58) Field of Classification Search ............... 711/4–6, 711/111–114, 150–154, 158, 163, 170–173, 711/118, 129, 159, 209; 707/1–2, 10, 102, 707/206; 718/100, 103–106
See application file for complete search history.

(56) References Cited

U.S. PATENT DOCUMENTS

| | | | | |
|---|---|---|---|---|
| 5,367,637 A | * | 11/1994 | Wei ............................. | 710/56 |
| 5,579,508 A | * | 11/1996 | Yoshizawa et al. ......... | 711/172 |
| 5,680,573 A | * | 10/1997 | Rubin et al. ................ | 711/129 |
| 5,727,185 A | * | 3/1998 | Mehner ....................... | 711/170 |
| 5,784,698 A | * | 7/1998 | Brady et al. ................ | 711/171 |
| 5,784,699 A | * | 7/1998 | McMahon et al. .......... | 711/171 |
| 5,819,304 A | * | 10/1998 | Nilsen et al. ................. | 711/5 |
| 5,905,889 A | * | 5/1999 | Wilhelm, Jr. ............... | 718/104 |
| 5,930,141 A | * | 7/1999 | Kamiyama et al. ......... | 700/159 |
| 5,950,231 A | * | 9/1999 | Nichol ....................... | 711/170 |
| 5,978,893 A | * | 11/1999 | Bakshi et al. ............... | 711/171 |
| 6,046,817 A | * | 4/2000 | Brown et al. ............... | 358/1.16 |

FOREIGN PATENT DOCUMENTS

| | | | |
|---|---|---|---|
| DE | 4224080 | * | 5/1994 |
| EP | 0 844 564 | | 5/1998 |
| EP | 0844564 | * | 5/1998 |
| WO | WO-0005652 | * | 3/2000 |

OTHER PUBLICATIONS

Haggander et al., Aug. 10-14, 1998, pp. 262-269.*

* cited by examiner

*Primary Examiner*—Donald Sparks
*Assistant Examiner*—Hashem Farrokh
(74) *Attorney, Agent, or Firm*—Brinks Hofer Gilson & Lione

(57) ABSTRACT

A method for dynamic memory management that includes determining a priority of a requesting program portion and, based on the determined priority of the requesting program portion, either allocating a memory area in real time to the requesting program portion or allocating a memory area not in real time to the requesting program portion.

14 Claims, 2 Drawing Sheets

METHOD FOR DYNAMIC MEMORY MANAGEMENT

Applicant claims, under 35 U.S.C. §§ 120 and 365, the benefit of priority of the filing date of Oct. 25, 2000 of a Patent Cooperation Treaty patent application, copy attached, Serial Number PCT/EP00/10492, filed on the aforementioned date, the entire contents of which are incorporated herein by reference, wherein Patent Cooperation Treaty patent application Serial Number PCT/EP00/10492 was not published under PCT Article 21(2) in English.

Applicant claims, under 35 U.S.C. § 119, the benefit of priority of the filing date of Oct. 27, 1999 of a German patent application, copy attached, Serial Number 199 51 716.9, filed on the aforementioned date, the entire contents of which are incorporated herein by reference.

BACKGROUND OF THE INVENTION

1. Field of the Invention

The present invention relates to a method for dynamic memory management.

2. Description of the Related Art

In connection with a real-time computer system it is known from U.S. Pat. No. 5,367,637, the entire contents of which are incorporated herein by reference, to employ two methods for memory allocation. In addition to the method present in the real-time computer system, an additional level between the application program and the real-time computer system is provided for achieving a self-optimizing and more efficient method for making memory space available. A rapid memory allocation is produced on the additional level by a memory pool, but without assuring that it is always possible to allocate memory space from the memory pool. A slower method is employed with the method already available in the computer system, wherein it is assured that it is always possible to allocate memory space. A pool made of memory blocks is installed on the additional level, from which a memory block can be taken when required. If there is no memory block in the pool, the already present method for memory allocation is used. In the course of this it is necessary to search all of the available memory space for a memory block which can be allocated and made available. During each initialization of the computer system, the number of memory blocks allocated to the pool is selected as a function of the number of requirements for memory blocks.

It is disadvantageous here that, as long as memory blocks are available in the pool, at least one memory block is taken out of the pool in case of a memory request. As soon as no more memory blocks are in the pool, the available physical memory space must be searched for a free memory block, which can take a relatively long time. This occurs regardless of whether memory is required for a program portion which must be executed in real time, or for a program portion which is not so time-critical.

A method for memory access is known from U.S. Pat. No. 5,930,141, the entire contents of which are incorporated herein by reference, which is said not to have any disadvantageous effect on the execution of a numerical control (NC) program. A first and a second memory are available, wherein the access time to the second memory is longer than to the first memory. The NC program is stored in the first memory. NC program blocks are divided into those, whose execution can wait, and those, whose execution cannot wait. As soon as access to the second memory is to take place during the execution of an NC program, a check is made whether the instruction of the next program block of the NC program next to be executed comes from a program block which can wait. Then access to the memory is performed prior to the instruction in the next program block. If the instruction in the next program block of the NC program cannot wait, the next program block is executed immediately following without first accessing the memory.

It is disadvantageous here that only a memory access to a slow memory is made, but no allocation of memory space. A further disadvantage is that a program block will only receive one instruction. Because of this it is necessary to add an identification to each single instruction whether or not the instruction can wait, and this identification must be checked during execution of the program. A further disadvantage lies in that a memory access, regardless of how important it is, possibly is not made and that a not inconsiderable delay can arise from this.

SUMMARY AND OBJECTS OF THE INVENTION

It is therefore an object of the present invention to disclose a method for dynamic memory management, wherein memory space is made available as quickly as possible, at least within a defined maximum length of time, for program portions which must be executed in real time, without it being necessary to reserve unnecessary amounts of memory space in a memory pool. Furthermore, this method should not result in considerable delays in the execution of the program.

This object is attained by a method for dynamic memory management that includes determining a priority of a requesting program portion and, based on the determined priority of the requesting program portion, either allocating a memory area in real time to the requesting program portion or allocating a memory area not in real time to the requesting program portion.

The method in accordance with the present invention has the advantage that a differentiation is made between program portions which must be executed in real time, which therefore must be allocated memory space especially rapidly, and program portions which need not be executed in real time and therefore do not require the allocation of memory space quite as rapidly. In accordance with the present invention the priority of the program portion from which the request for memory space comes is evaluated. Therefore it is only necessary to store memory sections in a pool for program portions which must be executed in real time and therefore have maximum priority, which reduces the memory space in the pool which needs to be stored for a request for memory space. For program portions which transmit a request for memory space and which have a lower priority, so that they need not be executed in real time, the available memory space is searched for a free memory area. It is furthermore advantageous that not every single program instruction is provided its own priority, but instead entire program portions including several program instructions. Since in most cases individual program instructions do not perform a complete function anyway, it is necessary to assign the same priority to several program portions which immediately follow one another anyway. By assigning a priority to program portions it is considerably less often necessary to check which priority happens to exist just then. Processing of the program is speeded up by this.

The present invention will be explained in greater detail in what follows by means of the embodiments represented in the drawings. The drawings show in:

DESCRIPTION OF THE PREFERRED EMBODIMENT(S) OF THE INVENTION

Figure 1:
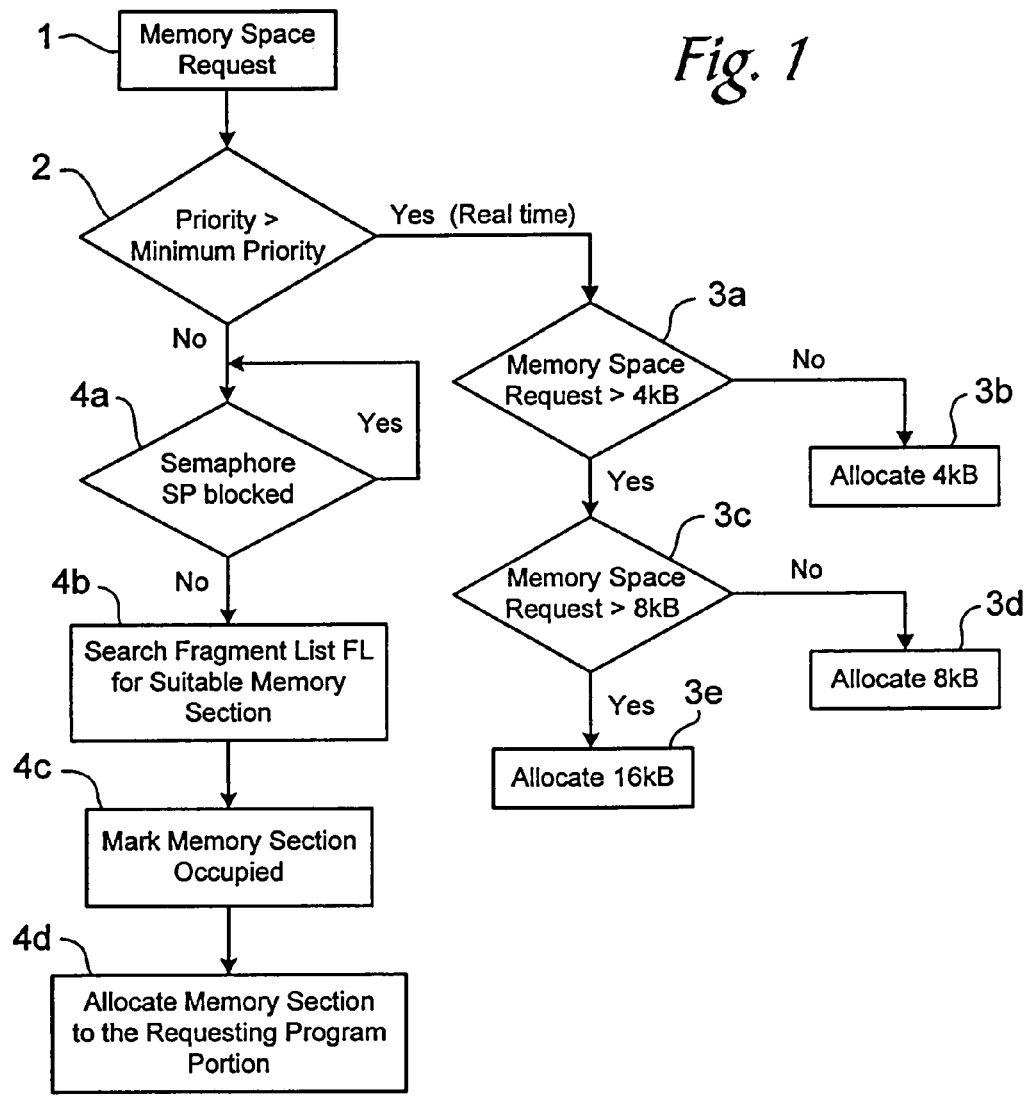
FIG. 1 shows an embodiment of a possible procedure for memory allocation in accordance with the present invention in connection with real time and non-real time priority of a requesting program portion.

If, as represented in FIG. 1, in the course of the execution of an NC program by an NC control there is a request 1 from the working memory of the processor by an NC program portion, a differentiation is made in step 2 which priority the program portion requesting the memory space has. By this it is possible to obtain a particularly rapid allocation of working memory to program portions with real time priority without it being necessary to occupy unnecessary amounts of working memory. If the priority at least corresponds to a minimum priority, the program operates in real time and therefore needs to have the required memory space allocated in real time in accordance with a first procedure 3. This occurs in that a determination is made in steps 3a and 3c, how much memory space was requested, and thereafter a memory portion of 4 kbytes is allocated from a previously occupied, or reserved for real time applications, memory pool SP1 (FIG. 2) in step 3b, or an 8 kbyte allocation from the memory pool SP2 in step 3d, or a 16 kbyte allocation from the memory pool SP3 in step 3e. Should an even larger memory section have been requested, an error message is put out, since it is assumed that no memory sections larger than 16 kbytes are required. To meet the real time conditions made, no non-real time method is used for memory allocation, since it would be too slow. Moreover, it is necessary to assure that the memory pools SP1 to SP3 always have sufficient memory sections available.

If the priority of a program portion requesting a memory space is less than a minimum priority, the program portion does not operate in real time, and in accordance with a second procedure 4 the memory allocation is not executed in real time. For this purpose, initially a check is made in step 4a whether the access to a fragment list FL, in which all occupied and non-occupied memory sections have been entered, is blocked by a semaphore SP. If this is not the case, the fragment list FL is searched for a memory section suitable for the request for memory space, otherwise a wait occurs until the fragment list FL has been released for access. In the course of an access, the fragment list FL is blocked to further access by the semaphore SP. If a suitable memory section has been found, it is marked as occupied by the requesting program portion in the fragment list FL in step 4c and is allocated to the requesting program portion in step 4d. Subsequently the fragment list FL is again released for access by the semaphore SP.

Figure 2:
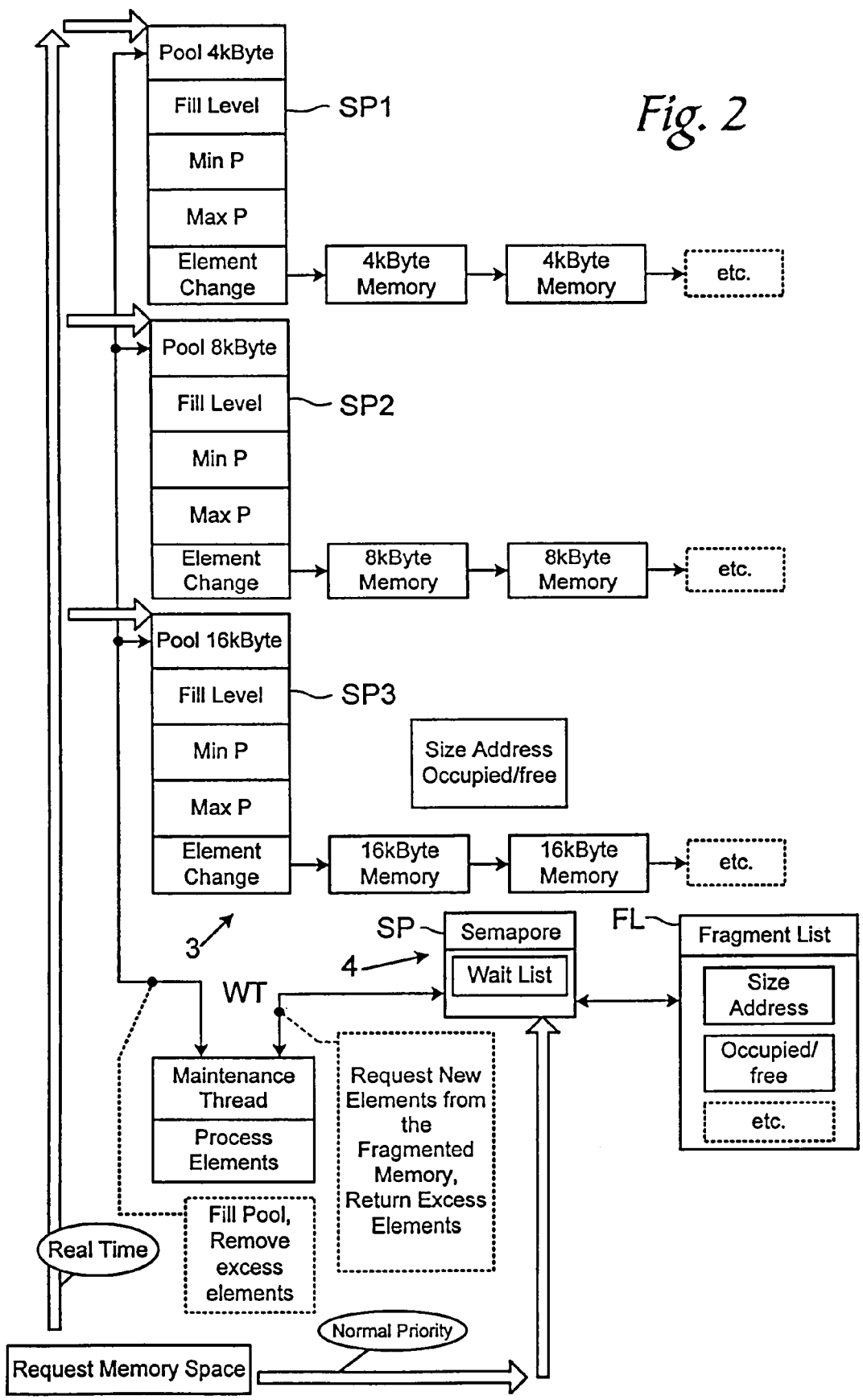
FIG. 2 shows an embodiment of a first and second procedure for memory allocation in accordance with the present invention.

A possible realization of the memory management in accordance with the present invention is represented in FIG. 2. In accordance with a first procedure 3, for the case where the program portion requesting memory space operates in real time, a memory section, which had previously been reserved for the pool SP1 and is at least as large as the requested memory space, is allocated to the program portion from this memory pool SP1. No occupation of the semaphore SP is required in the course of the allocation and assignment, since an occupied element, and therefore also its management information in the fragment list FL, cannot be altered by another party.

Several memory pools SP1 to SP3 are advantageously provided, each of which contains memory sections of equal size. For example, memory sections of a first size of 4 kbytes have been reserved in a first memory pool SP1, memory sections of a second size of 8 kbytes in a second memory pool SP2, and memory sections of a third size of 16 kbytes in a third memory pool SP3. The size is therefore always doubled. The sizes of the memory sections in the memory pools SP1 to SP3 are selected to be such that, on the one hand, no unnecessary amounts of memory space are wasted by it being necessary, for example, to allocate a 16 kbyte memory section to a request for 3 kbytes because smaller memory sections are not available. On the other hand, the size of the memory section is selected to be such that it is not necessary to allocate several memory blocks to a request for memory space if, for example 10 kbytes are requested and it becomes then necessary to allocate a block with 64 kbytes, because 16 kbyte memory sections are not available.

Each memory pool SP1 to SP3 contains information regarding the actual memory capacity, in particular it has a defined fill level which indicates how many memory sections are reserved in the memory pools SP1 to SP3. Moreover, a minimum fill level MinP and a maximum fill level MaxP are allocated to each memory pool SP1 to SP3. It is defined by the minimum fill level MinP, starting at which fill level a maintenance thread WT is activated for occupying new memory sections for the respective memory pools SP1 to SP3. It is defined by the maximum fill level MaxP, starting at which fill level a maintenance thread WT is activated so that superfluous memory sections can be removed from the memory pools SP1 to SP3 and therefore memory space is released for other uses. Moreover, a reference to the first memory section in the list of memory sections present in the respective memory pools SP1 to SP3 is provided in each memory pool SP1 to SP3. Each memory section contains a reference to the next following memory section of the memory pool SP1 to SP3, so that the memory sections of each memory pool SP1 to SP3 make reference to each other in the form of a linked list as represented in FIG. 2.

If it is determined by the maintenance thread WT that the minimum fill level MinP has fallen by a minimum value, for example at least 50%, the minimum fill level MinP is increased by the value by which this minimum value of the minimum fill level MinP has fallen. The maximum fill level MaxP is fixed as a defined multiple, for example twice the minimum fill level MinP, and is accordingly matched to the new value for the minimum fill level MinP.

On the basis of the requests for memory space arriving from the program portions it is possible to determine which size of the memory sections is most often required. Furthermore, on the basis of the conditions of modern computer systems it is advantageous to address at least 4 kbytes in a block. As a function of the size of the memory section needed, the demands for memory space are therefore divided into groups which differ in size by a whole number multiple of 4 kbytes.

As a function of the relative frequency of demands in these groups it is then possible to fix the number of memory pools SP1 to SP3, the minimum fill level and the maximum fill level in each memory pool SP1 to SP3, and the size of the memory sections in the memory pools SP1 to SP3. The values for each memory pool SP1 to SP3 determined in this way can then be stored in a non-volatile memory and taken into consideration during the next start of the program. Core values for memory management are adaptively set in this way and are self-optimizing. It is in addition possible to provide a non-volatile memory for each memory pool SP1 to SP3, in which the absolute minimum of the fill level of the respective memory pool SP1 to SP3 is stored. By a read-out of this memory it is also possible to detect minimum fill levels of the memory pools SP1 to SP3 which occur during real time applications, during which the maintenance thread WT has no access to the fill level of the memory pools SP1 to SP3.

Advantageously the maintenance thread WT has a priority which lies directly below the threshold value for real time execution. It is assured by this that, directly following the end of program portions which are executed in real time, a check is made whether the number of memory sections in the memory pools SP1 to SP3 is still above the minimum fill level MinP, and that it possibly always was in real time during program execution.

If the fragment list FL happens to be in use, the maintenance thread must wait until the fragment list FL is free again, which can be detected by the semaphore SP. Then the maintenance thread WT searches the fragment list FL for a free memory area having at least the requested size. The required size of memory is occupied by the requesting program portion and is allocated to the requesting program portion.

An alternative for the allocation of memory areas in real time in accordance with a first procedure lies in that only a single memory pool is provided, which contains memory sections of a minimum size of 4 kbytes, for example. A memory manager is furthermore provided, which re-codes logical addresses into physical addresses and vice versa. Then, in the course of a request for memory space in real time, as many memory sections are taken out of the memory pool and provided by the memory manager with directly sequential addresses until the requested memory size has at least been reached, and the memory area put together in this way is allocated to the requesting program portion.

For example, if 10 kbytes of memory are requested by a program portion with a minimum priority for real time, the first three memory sections of the linked list are selected from a memory pool with memory sections of 4 kbyte size. These memory sections can be arranged in an arbitrary manner in the available memory, in particular not directly following each other. Re-coding of logical addresses into physical addresses and vice versa of these three memory sections takes place through the memory manager in such a way that the logical addresses of the three memory sections directly follow each other. By this a coherent address space for the requested memory area is put together and can be allocated to the requesting program as a coherent memory area.

This has the advantage that it is possible to allocate memory areas of any arbitrary size and there is no limitation to the size of the memory sections present in the memory pool.

There are two realization options for the return of memory space the program no longer needs. No longer needed memory areas can be put back into the memory pools SP1 to SP3. For this purpose the fragment list FL is checked for the size of the memory area returned by the program. Subsequently this memory section is identified as reserved in the fragment list FL and is inserted into the linked list of the suitable memory pool. If in this case the fill level of the memory pool should exceed the maximum size MaxP, memory sections are removed from the linked list by the maintenance thread WT and identified as free in the fragment list FL.

Alternatively to this, memory areas no longer needed by the program can be entered on a separate list. The memory areas entered on this list are then immediately marked as free by the maintenance thread in the fragment list FL. Because of this it is not necessary to determine the length of these no longer needed memory areas, and entry into a memory pool is omitted, which results in a faster release. A further advantage lies in that it is possible in this way to also release memory areas for whose size there is no memory pool.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method for dynamic memory management, comprising:
   determining a priority of a requesting program portion; and
   based on said determined priority of said requesting program portion, either allocating a memory area in real time to said requesting program portion or allocating a memory area not in real time to said requesting program portion, wherein said allocating said memory area in real time comprises:
      taking out of a memory pool at least a first occupied memory section and a second occupied memory section;
      recoding physical addresses of said first occupied memory section and said second occupied memory section to form a continuous logical address space; and
      allocating said continuous logical address space as memory area to said requesting program portion.

2. A method for dynamic memory management, comprising:
   determining a priority of a requesting program portion; and
   based on said determined priority of said requesting program portion, either allocating a memory area in real time to said requesting program portion or allocating a memory area not in real time to said requesting program portion, wherein said allocating a memory area not in real time comprises:
      selecting a free memory area of at least a size requested by said requesting program portion from a fragment list, in which all occupied and free memory areas have been entered; and
      allocating said selected free memory area to said requesting program portion.

3. The method in accordance with claim 2, further comprising:
   storing for said memory area at least its value, its starting address and its occupied state in said fragment list, wherein different memory sections differ by an occupation status and by a program portion by which they are occupied.

4. The method in accordance with claim 2, further comprising:
   controlling access to said fragment list by a semaphore by blocking or permitting access to said fragment list.

5. A method for dynamic memory management, comprising:
   determining a priority of a requesting program portion; and
   based on said determined priority of said requesting program portion, either allocating a memory area in real time to said requesting program portion or allocating a memory area not in real time to said requesting program portion;
   making available at least a first memory pool comprising memory sections of a first size and a second memory pool comprising memory sections of a second size that is different than said first size;
   filling one of said first and second memory pools with free memory sections as a function of fill levels of said one of said first and second memory pools;
   wherein said allocating said memory area in real time comprises selecting either said first memory pool or said second memory pool as a function of a size of a memory area requested by said requesting program portion.

6. The method in accordance with claim 5, wherein said free memory sections are determined in accordance with said allocating said memory area not in real time.

7. A method for dynamic memory management, comprising:
   determining a priority of a requesting program portion; and
   based on said determined priority of said requesting program portion, either allocating a memory area in real time to said requesting program portion or allocating a memory area not in real time to said requesting program portion;
   making available at least a first memory pool comprising memory sections of a first size and a second memory pool comprising memory sections of a second size that is different than said first size;
   emptying one of said first and second memory pools by releasing free memory sections from said one of said first and second memory pools;
   wherein said allocating said memory area in real time comprises selecting either said first memory pool or said second memory pool as a function of a size of a memory area requested by said requesting program portion.

8. The method in accordance with claim 5, wherein a maintenance thread performs said filling and a priority of said maintenance thread lies directly below a minimum priority for said allocating said memory area in real time.

9. A method for dynamic memory management, comprising:
   determining a priority of a requesting program portion; and
   based on said determined priority of said requesting program portion, either allocating a memory area in real time to said requesting program portion or allocating a memory area not in real time to said requesting program portion;
   making available at least a first memory pool comprising memory sections of a first size and a second memory pool comprising memory sections of a second size that is different than said first size;
   reserving a defined number of said memory sections of said first memory pool when free memory sections of said first memory pool has fallen below a minimum fill level of said first memory pool;
   wherein said allocating said memory area in real time comprises selecting either said first memory pool or said second memory pool as a function of a size of a memory area requested by said requesting program portion.

10. The method in accordance with claim 9, further comprising:
    taking free memory sections from said first memory pool when a total number of said free memory sections of said first memory pool has exceeded a maximum fill level of said first memory pool.

11. The method in accordance with claim 10, further comprising:
    fixing said maximum fill level of said first memory pool as a defined multiple of said minimum fill level of said first memory pool.

12. The method in accordance with claim 9, further comprising:
    increasing said minimum fill level of said first memory pool as a function of an amount by which free memory sections of said first memory pool were reserved during program execution in real time.

13. A method for dynamic memory management, comprising:
    determining a priority of a requesting program portion; and
    based on said determined priority of said requesting program portion, either allocating a memory area in real time to said requesting program portion or allocating a memory area not in real time to said requesting program portion;
    making available at least a first memory pool comprising memory sections of a first size and a second memory pool comprising memory sections of a second size that is different than said first size;
    determining relative frequencies of memory requests for said first and second memory pools;
    determining expected values for the numbers of memory sections of said first and second memory pools based on said relative frequencies of memory requests; and
    using said expected values for memory management;
    wherein said allocating said memory area in real time comprises selecting either said first memory pool or said second memory pool as a function of a size of a memory area requested by said requesting program portion.

14. A method for dynamic memory management, comprising:
    determining a priority of a requesting program portion;
    based on said determined priority of said requesting program portion, either allocating a memory area in real time to said requesting program portion or allocating a memory area not in real time to said requesting program portion;
    determining, for the case when memory areas are no longer needed by said requesting program portion, sizes of said memory areas that are no longer needed; and
    inserting said memory areas into a memory pool.

* * * * *